United States Patent [19]

Cantoni, Angelo

[11] Patent Number: 4,747,378

[45] Date of Patent: May 31, 1988

[54] LUBRICATING OIL FILTER FOR INTERNAL COMBUSTION ENGINES, PARTICULARLY OF MOTOR VEHICLES, WITH MEMBERS FOR MONITORING THE DEGREE OF CLOGGING OF THE FILTRATION SURFACE

[75] Inventor: Cantoni, Angelo, Rome, Italy

[73] Assignee: Ital Idee s.r.l. an Italian Limited Liability Company, Rome, Italy

[21] Appl. No.: 860,022

[22] Filed: May 6, 1986

[30] Foreign Application Priority Data

May 6, 1985 [IT] Italy .............................. 48047 A/85

[51] Int. Cl.$^4$ ............................................. F01M 1/00
[52] U.S. Cl. ............................ 123/196 A; 123/196 S; 210/168
[58] Field of Search .................... 123/196 S, 196 A; 210/90, 168, 103, 105, 85, 86

[56] References Cited

U.S. PATENT DOCUMENTS 2,729,339  1/1956  McCoy ................................ 210/90
4,142,973  3/1979  Kachman ............................ 210/168

Primary Examiner—E. Rollins Cross
Attorney, Agent, or Firm—Fleit, Jacobson, Cohn & Price

[57] ABSTRACT

The lubricating oil filter of the invention comprises an outer casing which houses a filter element through which the oil passes, a pressure relief valve which prevents the oil passing through said filter element in the case of excessive pressure drop, and mutually facing metal plates separated by the filter element and arranged to form a capacitor, of which the filter element forms the dielectric, one of the plates being connected to the vehicle earth and the other being connected to an electrical conductor leading to the outside of the filter, the pressure relief valve being provided with means for connecting the electrical conductor to earth in the case of high pressure drop in the oil flow through the filter element, and with further means for connecting the electrical conductor to earth following repeated opening movements of the pressure relief valve, there being provided an instrument for measuring the capacitance of said capacitor and for indicating when the electrical conductor has been connected to earth.

11 Claims, 2 Drawing Sheets

LUBRICATING OIL FILTER FOR INTERNAL COMBUSTION ENGINES, PARTICULARLY OF MOTOR VEHICLES, WITH MEMBERS FOR MONITORING THE DEGREE OF CLOGGING OF THE FILTRATION SURFACE

BACKGROUND OF THE INVENTION

The present invention relates to a lubricating oil filter for internal combustion engines, particularly of motor vehicles, with members for monitoring the degree of clogging of the filtration surface.

Internal combustion engines are provided with a forced circulation lubrication circuit the purpose of which is to maintain a lubricating oil film between all those mechanical parts undergoing relative movement, in order to reduce their friction and to remove and dissipate the heat generated.

With the passage of time, impurities accumulate in the lubricating oil, these impurities consisting mainly of metal particles deriving from the wear of the engine sliding members, carbon particles produced by the fuel and by the combustion of the seeping oil, and mineral powders, generally siliceous and calcareous, deriving from the dust suspended in the intake air.

In order to eliminate these solid particles, which with the passage of time lead to considerable wear of the moving parts of the engine, a filter cartridge in the form of a thin sheet metal casing containing a folded paper cylinder, and a valve system for controlling the passage of oil are usually provided.

These filters comprise a pressure relief valve connected as a bypass, to ensure oil feed to the engine even when the oil pressure downstream of the valve is insufficient, due either to operation at high speed or to clogging of the filter.

When this valve opens it on the one hand ensures correct lubrication, even if the filter is clogged, but on the other hand enables not only the oil but also impurities contained in it to circulate through the engine members, to produce the aforesaid damage.

It is therefore of particular importance to determine the state of clogging of the oil filter in order to be able to replace it as soon as it has exceeded its limiting operational state before the pressure relief valve is subjected to too frequent opening movements or before the oil passing through it undergoes high pressure drop, without having to rely on an estimate of average life as in the case of filters known up to the present time.

SUMMARY OF THE INVENTION

This result is attained according to the present invention by a lubricating oil filter for internal combustion engines, particularly of motor vehicles, with members for monitoring the degree of clogging of the filtration surface, and comprising an outer casing which is provided with an end cover connectable to the engine lubrication circuit and containing passage for oil inlet and outlet, and which houses a filter element through which the oil passes, there also being provided a pressure relief valve which prevents the oil passing through said filter element in the case of excessive pressure drop, and mutually facing metal plates separated by the filter element and arranged to form a capacitor the capacitance of which varies with the degree of clogging of the filter, and of which the filter element forms the dielectric, one of the plates being connected to the vehicle earth and the other being connected to an electrical conductor leading to the outside of the filter, the pressure relief valve being provided with means for connecting the electrical conductor to earth in the case of high pressure drop in the oil flow through the filter element, and with further means for connecting the electrical conductor leading to the outside of the filter to earth following repeated opening movements of the pressure relief valve, thereby being provided an instrument for measuring the capacitance of said capacitor and for indicating when the electrical conductor leading to the outside of the filter has been connected to earth.

Considering the invention in greater detail, in one embodiment the filter element is supported internally by a metal grid which forms one of the plates of said capacitor it being electrically connected to the electrical conductor leading to the outside of the filter.

According to a further embodiment, the outer casing of the filter is of metal material which is electrically isolated from the metal support grid for the filter element and is connected to the vehicle earth, to form the second plate of said capacitor, or, if the outer casing is of a non-conducting material, externally to the filter element and facing the metal grid there is provided a metal element which is electrically isolated from the grid and is connected electrically to the vehicle earth, to form the second plate of the capacitor.

The pressure relief valve comprises a cylinder in which a piston can slide against friction and has one of its faces in hydraulic communication with the zone upstream of the filter element and its other in communication with the zone downstream of the filter element, with respect to the oil path through the filter, there being provided a pair of separated electrical contacts one of which is connected to the vehicle earth and the other is connected to the electrical conductor leading to the outside of the filter, they being arranged to come into mutual electrical contact, so closing the circuit which connects the conductor to earth, when the piston reaches the end of its stroke of travel within the cylinder, this travel being due to the existence of a pressure difference between its faces which produces a thrust exceeding the friction resistance which opposes its sliding.

According to a further embodiment of the present invention, in the pressure relief valve there is a cylinder in which a piston can slide against friction, one of its faces being in hydraulic communication with the zone downstream of the filter element with respect to the oil path through the filter, and the other face being in communication with a zone through which the oil passes when the pressure relief valve is open, there being provided a pair of electrical contacts arranged to be urged into mutual contact by said piston when it reaches the end of its stroke of travel within the cylinder, this travel being due to successive opening movements of the pressure relief valve, and thus closing the circuit for connecting the electrical conductor to earth.

Alternatively, the means for connecting the conductor to earth following repeated opening movements of the pressure relief valve can be formed from a layer of insulating material applied to the sealing surface of the valving member of the pressure relief valve and electrically separating said valving member from its closure seat, the valving member and the closure seat being electrically conducting and connected to the vehicle earth and to the electrical conductor leading to the outside of the filter, the insulating material forming the layer applied to the valving member being constituted by a material which can be eroded by the oil flow through the pressure relief valve when this is open.

An electrical capacity meter can be connected to the electrical conductor leading to the outside of the filter in order to measure the capacitance of the capacitor, which capacity meter can be calibrated in relation to the electrical characteristics of the type of filter measured and can provide an indication of the effective capacitance of the capacitor, which is variable up to a value which indicates the need for replacing the filter.

Alternatively, an instrument for measuring the capacitance of the capacitor and/or for indicating the closure of the electrical contacts can be permanently mounted on the vehicle and connected to said electrical conductor, and comprise an electronic circuit arranged to cause a signal to appear on the dashboard when the capacitance of the capacitor passes beyond a predetermined value and/or when the electrical contacts close.

DESCRIPTION OF THE DRAWINGS

Further details will be apparent from the description given hereinafter with reference to the accompanying drawings, which illustrate embodiments of the invention and in which.

DETAILED DESCRIPTION

Figure 1:
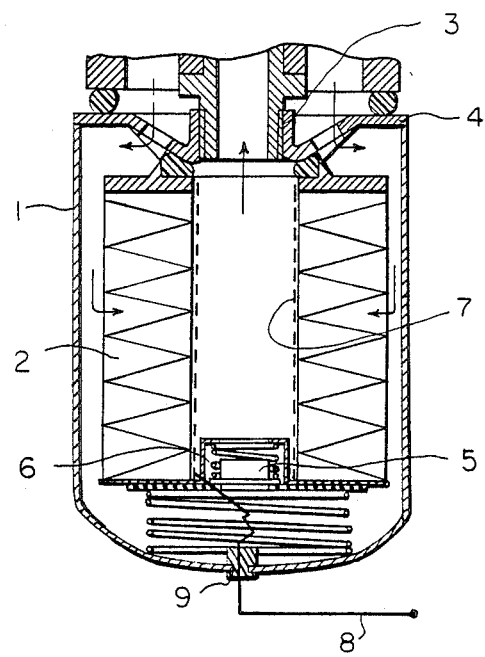
FIG. 1 is an overall sectional view of a filter according to the invention.

As shown in FIG. 1, the filter according to the invention consists of an outer casing 1, usually of metal material, which encloses a paper filter element 2 and is connected to the engine lubrication circuit by way of the threaded connector 3 on its end cover 4. The oil path through its interior is shown diagrammatically by the arrows in the figure, and is such as to traverse the paper element, which is constructed with a large passage surface to minimise the pressure drop of the oil flow through it.

There is also provided a pressure relief valve 5 fitted with a return spring 6. When open, the valve allows the oil to pass freely through the filter by bypassing the filter element 2, if this latter is clogged or during high-speed operation, in order to ensure in all cases that sufficient oil passes.

The filter element 2 is supported internally by a metal grid 7 which is electrically isolated from the outer casing 1. In the filter according to the invention, the grid 7 and outer casing 1 form the plates of a capacitor, of which the filter element 2 constitutes the dielectric. The outer casing 1 is connected to the vehicle earth, whereas the grid 7 is connected by way of the metal parts of the pressure relief valve 5 to a conductor 8, which leaves the filter through the insulatiing bush 9.

Figure 3:
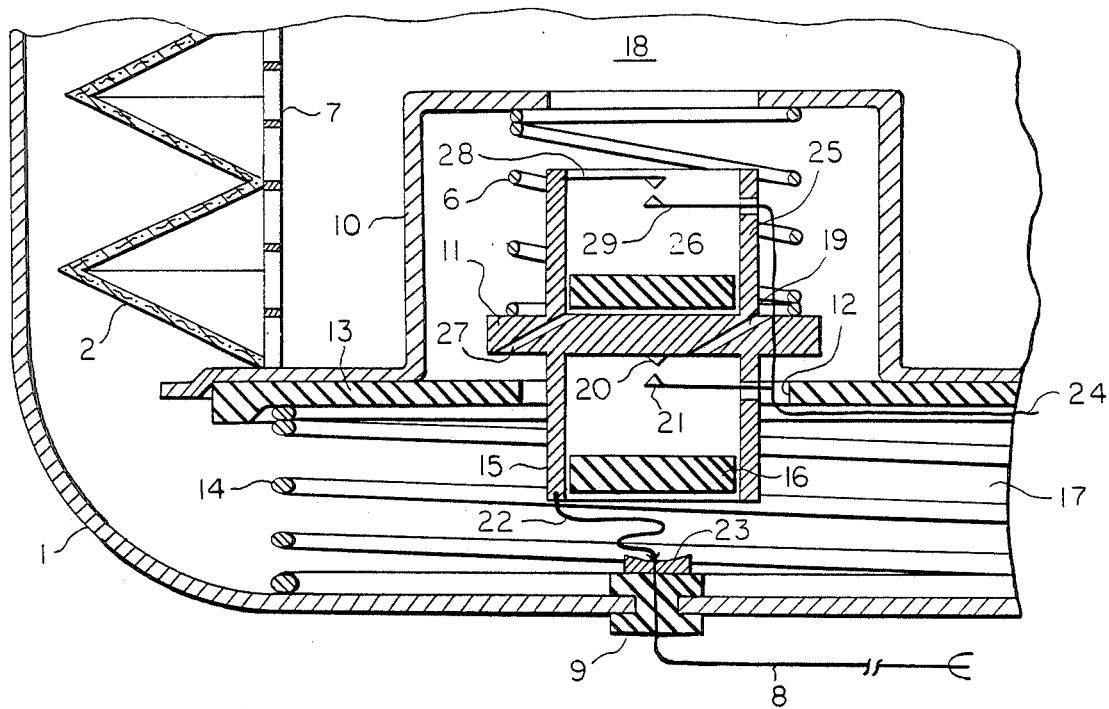
FIG. 3 is a partial section through the lower portion of one embodiment of the filter according to the invention.

As shown in FIG. 3, the pressure relief valve 5 is formed from a metal capsule 10 in electrical contact with the grid 7 and containing a valving member 11, which is urged by the spring 6 to form a seal against the central aperture 12 of a bush 13 of insulating material. The bush 13, the capsule 10, the grid 7 and the filter element 2 are kept in position by a spring 14 acting against the outer casing 1 of the filter.

The valving member 11 comprises a cylinder 15 in which a piston 16 of semi-rigid plastic material can slide under the action of a pressure difference between the zone 17 upstream of the filter element 2, and the zone 18 downstream of said filter element. Communication between the zone 18 and the relative face of the piston 16 is obtained by means of a sized bore 19.

The valving member 11 is constructed of a conducting material and comprises a fixed electrical contact 20 and an electrical contact 21 which is mobile under the action of the piston 16 as this latter reaches the end of its stroke, to close the electrical circuit between the contacts 20 and 21.

The valving member 11 is connected electrically to the cable 22, which is able to follow its opening and closure movements, and rests against the metal disc 23 of the bush 9, and the mobile contact 21 is connected to the outer casing 1, and from there to the vehicle earth, by means of the conductor 24 which is in contact with the spring 14.

In the upper part of the valving member 11 there is a cylinder 25, in which a sliding piston 26 is disposed. There opens on to the lower face of the piston 26 a sized bore 27, which is closed when the valving member 11 is lowered to seal against the bush 13, and is open when the valving member is raised by the effect of excessive pressure drop in the oil flow through the filter element.

At the upper end of the cylinder 25 there are a fixed electrical contact 28 and a mobile electrical contact 29, which is separated from the preceding until the piston 26 is raised and acts against it.

This happens should the valving member 11 undergo multiple opening movements, which enable the oil, under high pressure in this zone, to pass through the bore 27 to apply to the lower face of the piston 26 a pressure which is greater than that existing in the zone 18, and thus cause the piston 26 to successively advance until it pushes against the mobile contact 29.

Figure 2:
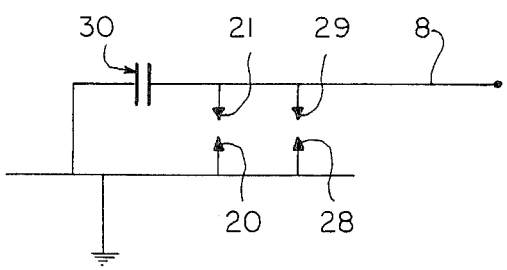
FIG. 2 shows the electrical circuit diagram of the filter.

FIG. 2 shows the electrical circuit diagram of the filter according to the invention, comprising the capacitor 30 formed by the outer casing 1 and grid 7 of the filter, and the electrical contacts 20, 21 and 28, 29, which are open under normal operating conditions.

Having access to the conductor 8, it is therefore possible to measure the capacitance of the capacitor 30, which varies with the progressive deposition of particles on the filtration surface and thus with the degree of filter clogging.

If calibrated to take account of the electrical characteristics of the filter, the calibration possibly being supplied as an identification code for the filter itself, an instrument connected to the conductor 8 can measure the capacitance of the capacitor 30, to indicate its variation until it passes beyond the value corresponding to a degree of clogging which requires replacement of the filter. The closure of the contacts 20, 21 or 28, 29 short-circuits the capacitor plates formed by the outer casing 1 and grid 7 of the filter, to give an immediate indication that the limits of correct filter operation have been exceeded.

A capacity measuring instrument could be connected to the conductor 8 only when it is required to check the filter operation, and in this case the end of the conductor 8 would be provided with an electrical connection pin for connection to a contact cable of this instrument.

Figure 5:
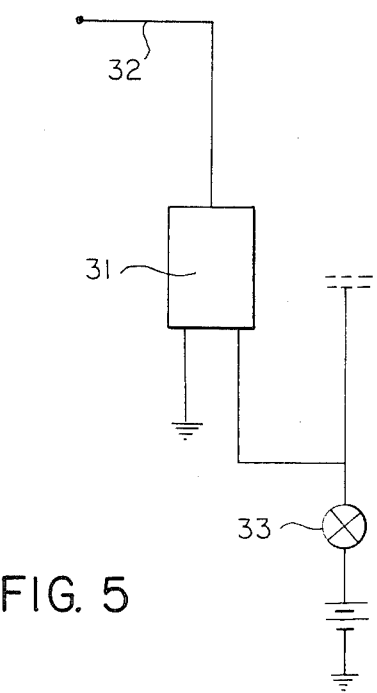
FIG. 5 is an example of an electrical connection diagram for feeding a signal to the dashboard.

A measuring instrument could also be permanently installed on the vehicle, for example in accordance with the diagram of FIG. 5. In this case, the instrument 31 is connected to the conductor 8 by its own contact cable 32, and possesses an electronic circuit which, when the instrument indicates the predetermined capacitance change or when said contacts 20, 21 or 28, 29 close, causes that warning lamp 33 which normally exists on the dashboard and is connected to the pressure switch of the oil circuit to light, for example with an intermittent signal. In this manner, a precise indication of the state of wear of the filter is given on the vehicle dashboard, without requiring the installation of a further warning lamp on the dashboard.

Figure 4:
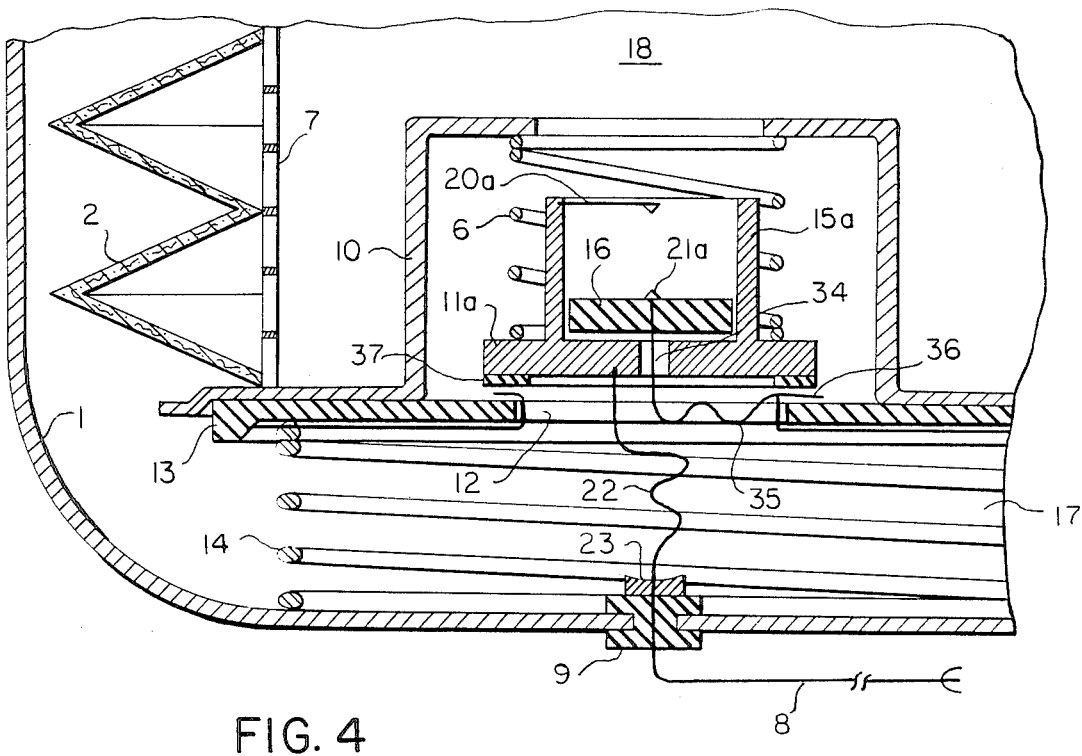
FIG. 4 is a partial section through the lower portion of a second embodiment of the filter.

FIG. 4 shows an alternative embodiment of the filter according to the invention, in which the valving member 11a of the pressure relief valve 5 is provided with a cylinder 15a carrying a piston 16a which, when it reaches the end of its stroke of travel within the cylinder 15a, urges its mobile contact 21a into electrical contact with the fixed contact 20a.

The lower face of the piston is in hydraulic communication with the zone 17 by means of a duct 34 through which there also passes the flexible cable 35 which connects the mobile contact 21a to the spring 14 and to the outer casing 1 of the filter.

In order to indicate that the filter pressure relief valve has opened an excessive number of times, the cylinder 25 and piston 26 of FIG. 3 are replaced by a conducting element 36 on the bush 13, connected electrically to the spring 14 and casing 1. When in its closed position, the valving member 11a is kept electricially isolated from said conducting element 36 by a gasket 37 of insulating material. This insulating material, of small thickness, for example a few tenths of a millimeter, is able to be progressively eroded by the high-velocity oil flow which occurs during opening of the valving member 11a. When sufficient erosion of the gasket 37 has taken place following repeated opening and closure movements of the valving member, electrical contact is made between the valving member and conductor 36, to indicate that the filter requires replacing.

A filter according to the invention can be provided with the three described elements sensitive to clogging, i.e. plates for capacitance measurements, contacts arranged to close if a high pressure drop across the filter element persists, and contacts arranged to close following a large number of opening movements of the pressure relief valve. However, even only one of said sensitive elements could be provided, as each of them is sufficient to provide a valid indication of the reduced operability of the filter.

If the capacitive element is present, the measuring instrument has to be calibrated for each type of filter. This calibration need be carried out only once on assembly if the measuring instrument is mounted in the vehicle, whereas if the measuring instrument is used for several different vehicles using filters of different types, for example for workshop use, the calibration has to be made at each measurement, there being provided an identification code for the electrical characteristics of the filter, on the basis of which the calibration values of the instrument are chosen.

Various modifications can obviously be made to the filter according to the invention, but without leaving the scope of protection of the invention itself.

What is claimed is:
1. A lubricating oil filter for internal combustion engines, particularly for motor vehicles, with members for monitoring the degree of clogging of the filtration surface, said lubricating oil filter comprising:
   an outer casing including an end cover connectable to an engine lubrication circuit and containing passages for oil inlet and outlet, and housing a filter element through which oil passes,
   a pressure relief valve preventing oil passing through said filter element upon exceeding a predetermined pressure drop,
   mutually facing metal plates separated by said filter element and arranged to form a capacitor, said filter element forming a dielectric of said capacitor,
   one of said mutaully facing plates being connected to the vehicle earth and the other of said mutually facing plates being connected to an electrical conductor leading to the outside of the filter,
   said pressure relief valve being provided with means for connecting said electrical conductor to earth upon exceeding said predetermined pressure drop in oil flow through said filter element,
   means for connecting said electrical conductor leading to the outside of the filter to earth following repeated opening movements of said pressure relief valve, and
   an instrument for measuring the capacitance of said capacitor and for indicating when said electrical conductor leading to the outside of the filter has been connected to earth.
2. A lubricating oil filter according to claim 1, wherein said filter element is supported internally by a metal grid forming said one of said mutually facing plates of said capacitor, said metal grid being electrically connected to said electrical conductor leading to the outside of the filter.
3. A lubricating oil filter according to claim 2, wherein said outer casing of the filter is of metal material electrically isolated from said metal grid and is connected to the vehicle earth, to form said other of said two mutually facing plates of said capacitor.
4. A lubricating oil filter according to claim 2, wherein externally to said filter element and facing said metal grid there is a metal element electrically isolated from said metal grid and connected electrically to the vehicle earth, to form said other of said two mutually facing plates of said capacitor.
5. A lubricating oil filter according to claim 1, wherein said pressure relief valve comprises a cylinder in which a piston can slide against friction and has one of its faces in hydraulic communication with a zone upstream of said filter element and and another face is in communication with a zone downstream of said filter element, with respect to the oil path through the filter, there being provided a pair of separated electrical contacts, one of which is connected to the vehicle earch and the other is connected to said electrical conductor leading to the outside of the filter, they being arranged to come into mutual electrical contact, so closing the circuit which connects the conductor to earth, when the piston reaches the end of its stroke of travel within said cylinder, this travel being due to the existence of a pressure difference between the faces of said piston which produces a thrust exceeding the friction resistance which opposes its sliding.
6. A lubricating oil filter according to claim 1, wherein in said pressure relief valve there is a cylinder having a piston sliding therein and having one of its faces in hydraulic communication with a zone located downstream of said filter element, with respect to the oil path through the filter, and its other face in communication with a zone through which the oil passes when said pressure relief valve is open, there being provided a pair of electrical contacts arranged to be urged into mutual contact by said piston when said piston reaches the end of its stroke of travel within the cylinder, this travel being due to successive opening movements of the pressure relief valve, and thus closing a circuit which connects said electrical conductor to earth.

7. A lubricating oil filter according to claim 1, wherein said means for connecting said electrical conductor to earth following repeated opening movements of said pressure relief valve are formed from a layer of insulating material applied to a sealing surface of a valving member and electrically separating said valving member from a closure seat, said valving member and said closure seat being electrically conducting and connected to the vehicle earth and to said electrical conductor leading to the outside of the filter, said insulating material forming the layer applied to the valving member being erodable by the oil flow through said pressure relief valve when said pressure relief valve is open.

8. A lubricating oil filter according to claim 1, wherein said instrument for measuring the capacitance of said capacitor and for indicating the closure of electrical contacts is permanently mounted on the vehicle and connected to said electrical conductor, and includes an electronic circuit arranged to cause a signal to appear on a dashboard when the capacitance of said capacitor passes beyond a predetermined value and when said electrical contacts close.

9. A lubricating oil filter according to claim 8, wherein said electronic circuit causes a warning lamp connected to an oil circuit pressure switch to light.

10. A lubricating oil filter according to claim 1, wherein an electrical capacity meter is connected to said electrical conductor leading to the outside of the filter to measure the capacitance of said capacitor, said capacity meter being calibrated in relation to electrical characteristics of the type of filter measured, to provide an indication of the effective capacitance of said capacitor, which is variable up to a value indicating a need for replacing the filter.

11. A lubricating oil filter according to claim 1, wherein said instrument is permanently mounted on the vehicle and connected to said electrical conductor, and includes an electronic circuit arranged to cause a signal to appear on a dashboard when the capacitance of said capacitor passes beyond a predetermined value.

* * * * *